(12) United States Patent
Kwok et al.

(10) Patent No.: US 8,742,288 B2
(45) Date of Patent: Jun. 3, 2014

(54) LASER APPARATUS FOR SINGULATION, AND A METHOD OF SINGULATION

(75) Inventors: Chi Hang Kwok, Hong Kong (CN); Chi Wah Cheng, Hong Kong (CN)

(73) Assignee: ASM Technology Singapore Pte Ltd, Singapore (SG)

( * ) Notice: Subject to any disclaimer, the term of this patent is extended or adjusted under 35 U.S.C. 154(b) by 334 days.

(21) Appl. No.: 13/160,624

(22) Filed: Jun. 15, 2011

(65) Prior Publication Data

US 2012/0318777 A1 Dec. 20, 2012

(51) Int. Cl.
*B23K 26/06* (2014.01)

(52) U.S. Cl.
USPC .................. 219/121.75; 219/121.73

(58) Field of Classification Search
USPC ....................... 219/121.61–121.75
See application file for complete search history.

(56) References Cited

U.S. PATENT DOCUMENTS

| 5,524,018 | A  | * | 6/1996 | Adachi | 372/98 |
| 6,225,595 | B1 | * | 5/2001 | Wei et al. | 219/121.69 |
| 2004/0172106 | A1 | * | 9/2004 | Imaizumi | 607/89 |
| 2011/0086441 | A1 | * | 4/2011 | Kawaguchi et al. | 438/7 |

* cited by examiner

*Primary Examiner* — Samuel M Heinrich
(74) *Attorney, Agent, or Firm* — Ostrolenk Faber LLP

(57) ABSTRACT

An apparatus 101 for singulating an object is disclosed. The apparatus 101 comprises a laser 103 configured to emit a laser beam 105 with a Gaussian irradiance profile, as well as a beam-shaping device 115 configured to reshape the Gaussian irradiance profile of the laser beam 105 emitted from the laser 103. In particular, the beam-shaping device 115 has a plurality of aspherical lenses 117, 119 to redistribute irradiance of the laser beam 105, so as to reduce variation of the irradiance in an effective irradiation spectrum of the laser beam 105 for singulating the object. By redistributing the irradiance of the laser beam 105, irradiation energy may be more efficiently delivered to the semiconductor wafer 102 for laser singulation, compared with conventional laser beams with Gaussian irradiance profiles which are non-uniform. A method of singulating an object is also disclosed.

19 Claims, 12 Drawing Sheets

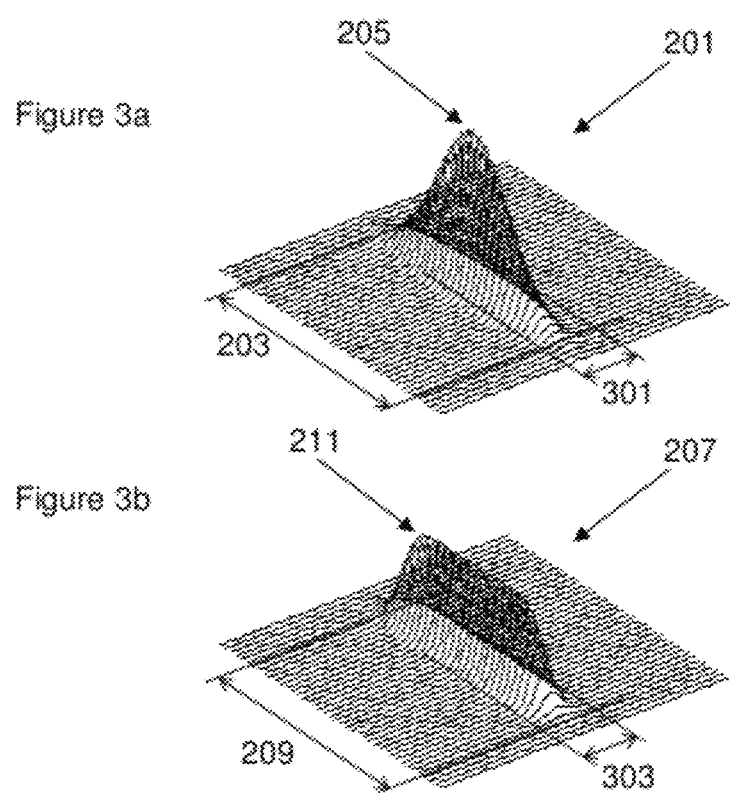

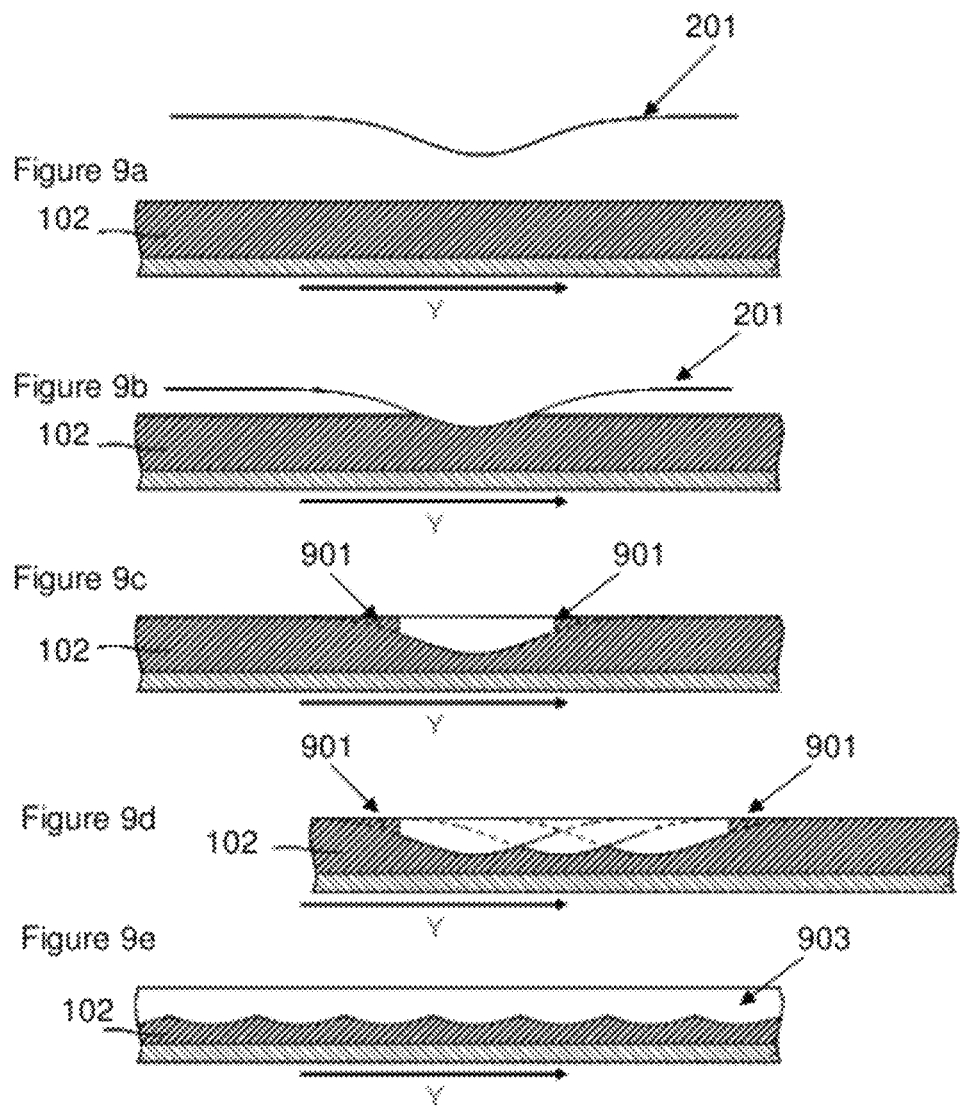

LASER APPARATUS FOR SINGULATION, AND A METHOD OF SINGULATION

FIELD OF THE PRESENT INVENTION

This invention relates to a laser apparatus for singulating an object using optics, and a method of singulating the same. The laser apparatus is particularly, but not exclusively, configured to singulate semiconductor wafers for fabricating semiconductor devices.

BACKGROUND OF THE INVENTION

Multiple semiconductor devices are fabricated in a matrix on a semiconductor wafer, which is typically made of material such as sapphire, copper, silicon, and/or their compounds. The semiconductor wafer is then cut by a laser to divide or assist in dividing the semiconductor devices into separate pieces. Laser singulation may include any of the following processes: i) laser scribing, in which linear grooves (or scribe lines) are formed on the semiconductor wafer surface to facilitate breakage along the grooves; or ii) laser cutting, in which the semiconductor wafer is cut through from its top surface to its bottom surface.

Laser singulation is contingent on delivering irradiance (i.e. fluence or energy) to the semiconductor wafer that exceeds its material ablation threshold. By focusing a Gaussian laser beam using an objective lens, a laser output width of the Gaussian laser beam can be made small in the order of 1 to 20 μm. Such dimensions of the laser beam ensure that its irradiance exceeds the material ablation threshold of the semiconductor wafer for laser singulation.

However, when the laser beam width is made small, it is important to ensure that a distance between two consecutive laser pulses is within a maximum possible distance $D_{pulse}$ in order to effect singulation. The relation between the maximum possible distance $D_{pulse}$ of two consecutive laser pulses, the feeding speed $V_{feeding}$ of the laser beam, and the pulse repetition frequency $f_{pulse}$ of the laser beam is governed by the following equation:

$$D_{pulse} = V_{feeding}/f_{pulse} \text{ (measured in units of mm/pulse or μm/pulse)}$$

It is therefore seen that the feeding speed $V_{feeding}$ of the laser beam is constrained by the maximum possible distance $D_{pulse}$. One way to increase the feeding speed $V_{feeding}$ of the laser beam is by increasing its pulse repetition frequency $f_{pulse}$. However, although the laser beam gives higher average power at higher pulse reception frequencies $f_{pulse}$, its pulse energy drops rapidly as its pulse repetition frequency $f_{pulse}$ exceeds a certain threshold. Accordingly the feeding speed $V_{feeding}$ of the laser beam is ultimately limited by the constraints of both its optimum pulse repetition frequency $f_{pulse}$ and the maximum possible distance $D_{pulse}$.

In addition, scribe lines on the semiconductor wafer as formed by the Gaussian laser beam typically have a trough-like scribe depth along the scribing direction. This is because the irradiance distribution of the laser beam is of a Gaussian nature. Accordingly, portions of the scribe line that receives a weaker irradiance from the laser beam will have smaller depths compared with other portions that receive a stronger irradiance. To ensure a consistent scribe depth along the entire linear groove, further constraints may have to be imposed on the feeding speed of the laser beam.

Thus, it is an object of this invention to relax the aforesaid constraints on the feeding speed of the laser output to improve overall throughput.

BRIEF DESCRIPTION OF THE DRAWINGS

Embodiments of this invention will now be described, by way of example only, with reference to the drawings in which:

FIGS. 3a and 3b show corresponding 3D irradiance profiles of FIGS. 2a and 2b respectively;

FIGS. 9a to 9e show various cross-sectional views of a semiconductor wafer during laser scribing using the conventional laser output;

SUMMARY OF THE INVENTION

Figure 1:
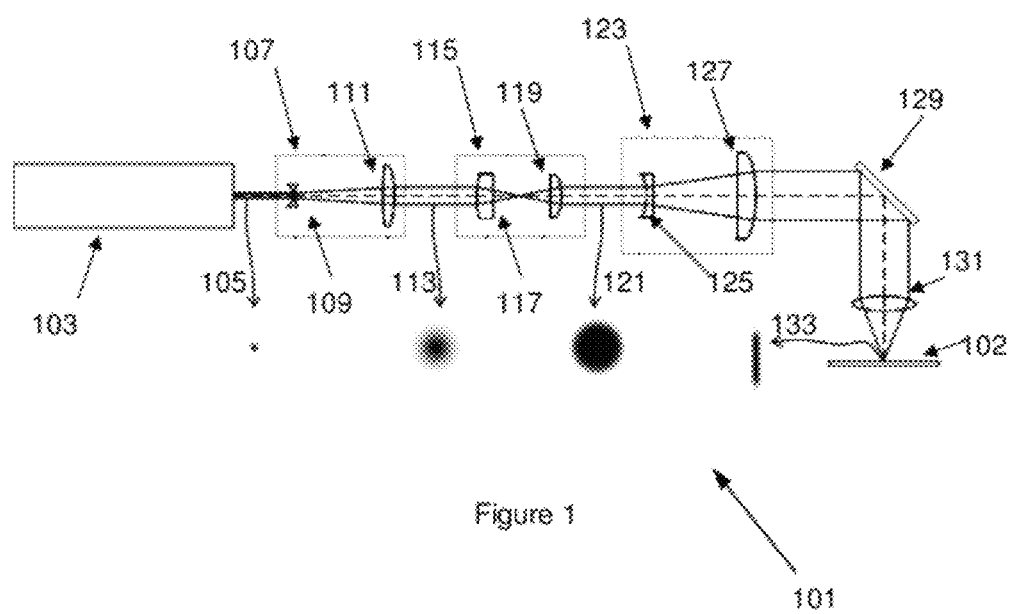
FIG. 1 shows a laser system according to an embodiment of the present invention.

A first aspect of the invention is an apparatus for singulating an object. The apparatus comprises: i) a laser configured to emit a laser beam with a Gaussian irradiance profile; and ii) a beam-shaping device configured to reshape the Gaussian irradiance profile of the laser beam emitted from the laser. In particular, the beam-shaping device has a plurality of aspherical lenses to redistribute irradiance of the laser beam, so as to reduce variation of the irradiance in an effective irradiation spectrum of the laser beam for singulating the object.

It should be noted that embodiments of the claimed apparatus not only include lasers that are configured to emit laser beams with strictly-defined Gaussian irradiance profiles, but also lasers that are configured to emit laser beams with approximately-defined Gaussian irradiance profiles.

By redistributing the irradiance of the laser beam, more irradiation energy of the laser beam may be suitably utilised to singulate the semiconductor wafer, compared with conventional laser beams with irradiance of Gaussian profiles which are non-uniform. Advantageously therefore, embodiments of the claimed apparatus may provide a more efficient use of the irradiation energy from the laser beams.

Moreover, a higher depth uniformity of a scribe line may be achieved through the use of embodiments of the claimed apparatus, compared with conventional lasers. Accordingly, embodiments of the claimed apparatus would not be constrained by a smaller feeding speed if higher depth uniformity of a scribe line is desired. By contrast, the feeding speed of the conventional lasers may be compromised in order to increase their respective pulse overlapping ratios to ensure a higher scribe depth uniformity. As embodiments of the claimed apparatus are less likely to be constrained by their feeding speeds, their throughput capacities would advantageously be higher than that of conventional lasers.

Some optional features of the claimed apparatus have been defined herein.

For instance, embodiments of the claimed apparatus may include a first beam-expanding device configured to magnify the laser beam emitted from the laser. Embodiments of the claimed apparatus may also include a second beam-expanding device configured to modify the laser beam with the reshaped irradiance profile to define a major longitudinal axis and a minor axis orthogonal to the major longitudinal axis, wherein the modified laser beam has a larger width along the major longitudinal axis than along the minor axis. By including the first and second beam-expanding devices, a desired aspect ratio of the laser output—i.e. a ratio of its width along the major longitudinal axis to its width along the orthogonal minor axis—may be advantageously manipulated for optimal performance of the laser singulation process.

A second aspect of the invention is a method of singulating an object. The method comprises the steps of: emitting a laser beam with a Gaussian irradiance profile; redistributing the irradiance of the emitted laser beam using a plurality of aspherical lenses to reshape the Gaussian irradiance profile, so as to reduce variation of an effective irradiance spectrum of the laser beam for singulating the object.

DETAILED DESCRIPTION OF THE EMBODIMENTS

FIG. 1 shows a laser system 101 for scribing a semiconductor wafer 102. The laser system 101 includes: i) a laser 103 for emitting a circular Gaussian collimated beam 105; ii) a first beam expander 107 having two optical components (shown in FIG. 1 as aberration-corrected spherical lenses 109, 111) for magnifying the collimated beam 105 to form an expanded collimated beam 113; iii) a beam shaper 115 having two optical components (shown in FIG. 1 as a pair of aspherical lenses 117, 119) for shaping irradiance of the expanded collimated beam 113 to form a 'flattened' collimated beam 121 (details below); iv) a second beam expander 123 having two optical components (shown in FIG. 1 as cylindrical lenses 125, 127) for modifying an aspect ratio of the flattened collimated beam 121 (i.e. a ratio of respective widths of the beam along orthogonal axes); v) a mirror 129 for reflecting the flattened collimated beam 121 with the modified aspect ratio; and vi) a beam-focusing device (shown in FIG. 1 as a focusing lens assembly 131) for focusing the reflected flattened collimated beam 121 to form a 'flattened' laser output 133 on the surface of a semiconductor wafer 102.

Specifically the first beam expander 107 magnifies the Gaussian collimated beam 105 to a suitable spot diameter configured for the beam shaper 115. The beam shaper 115 then distributes the irradiance of the expanded collimated beam 113, so that the flattened collimated beam 121 has a uniform irradiance profile. The aspherical lenses 117, 119 of the beam shaper 115 may be fabricated from micro-lens or using holographic techniques. By shaping surface profiles of the aspherical lenses 117, 119 accordingly, a desired refractive index that ensures controlled phase distribution of electromagnetic waves within an operating range of wavelength can be configured. In particular the beam shaper 115 distributes the irradiance of the expanded collimated beam 113 by first causing it to converge with predetermined aberration characteristics through the aspherical lens 117, and subsequently causing the collimated beam 113 to diverge with the aspherical lens 119 to collect the redistributed electromagnetic waves.

The second beam expander 123 modifies the aspect ratio of the flattened collimated beam 121 for optimum processing and thus higher throughput for cost-effective manufacturing. The combination of the lenses 109, 111, 117, 119, 125, 127 also allows precise aberration control of the flattened collimated beam 121 (with the modified aspect ratio) within a desired spatial range. The flattened collimated beam 121 (with the modified aspect ratio) is then reflected by the mirror 129 to the focusing lens assembly 131, which focuses the flattened laser output 133 on the semiconductor wafer 102. FIG. 1 shows the flattened laser output 133 having a major longitudinal axis as well as a minor axis orthogonal to the major longitudinal axis. In particular, the flattened laser output 133 has a larger width along the major longitudinal axis than along the minor axis. Also, the flattened laser output 133 is focused on the semiconductor wafer 102 such that its major longitudinal axis is aligned with a direction of singulation (i.e. a feeding direction) of the semiconductor wafer 102.

Typically, an irradiance profile of a laser output can be quantified by defining its encircled power. The irradiance profile is useful to control the precise amount of irradiance delivered to a workpiece surface such as a semiconductor wafer to maximise efficiency of laser singulation. From the irradiance profile, an 'energy circle' of the laser output can be derived by determining the 60%-limit based on its maximum encircled power. A characteristic beam width of the laser output is then accordingly defined based on the width of the energy circle.

Figure 2A:
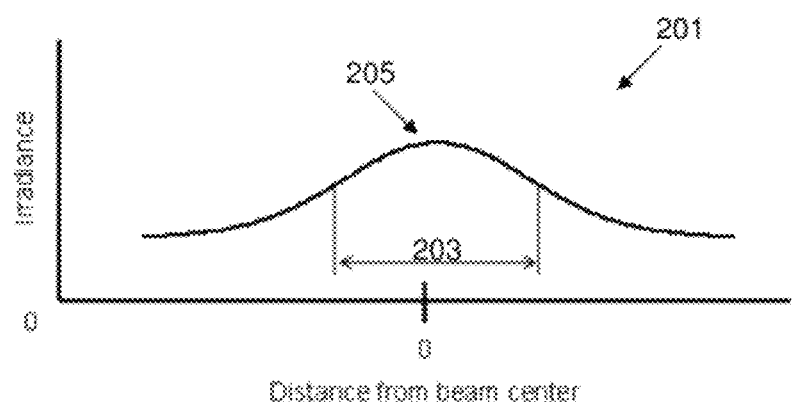
FIG. 2a shows an irradiance profile of a conventional laser output.
Figure 2B:
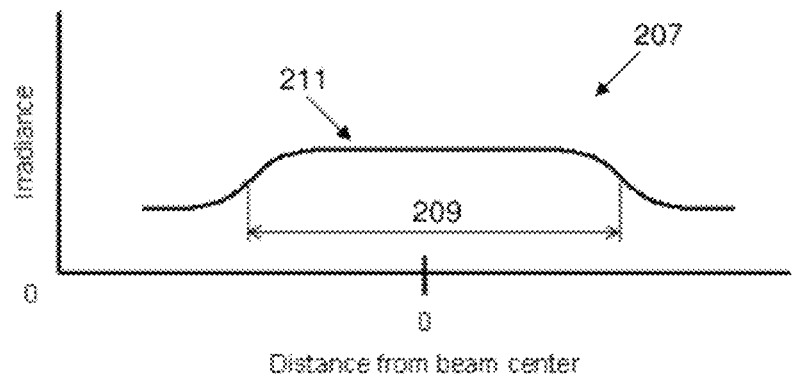
FIG. 2b shows an irradiance profile of a laser output from the laser system of FIG. 1.

FIGS. 2a and 2b compare the irradiance profiles of: i) a conventional laser spot; and ii) the flattened laser output 133 along their feeding axes respectively.

FIG. 2a shows a Gaussian irradiance profile 201 of the conventional laser output with a characteristic beam width 203 and a peak irradiance 205. By contrast, the irradiance profile 207 of the flattened laser output 133 shown in FIG. 2b has a more uniform (and thus flatter and less varied) peak irradiance 211 than the shaper peak irradiance 205 of the conventional laser output.

Moreover the irradiance profile 207 of the flattened laser output 133 has a larger characteristic beam width 209 than that of the conventional laser output. This means that a larger proportion of the irradiance of the flattened laser output 133 falls within its energy circle than in the case of the conventional laser output. Accordingly a larger proportion of the irradiance profile of the flattened laser output 133 may have irradiance above the material ablation threshold of the semiconductor wafer 102—i.e. an effective irradiation spectrum for singulating the semiconductor wafer 102—thereby leading to better utilisation of the laser irradiance for laser singulation.

FIGS. 3a and 3b show the corresponding 3D irradiance profiles of the conventional laser output and the flattened laser output 133 respectively. It can be seen from these 3D irradiance profiles that the conventional laser output and the flattened laser output 133 both have diffraction-limited widths 301, 303 in their respective minor axes on the semiconductor wafer plane and orthogonal to their major longitudinal feeding axes. However, the diffraction-limited width of the conventional laser output having the Gaussian irradiation profile is typically larger than that of the flattened laser output 133. It can be seen from FIG. 3b that the 3D irradiance profile of the flattened laser output 133 is substantially trapezoidal.

A diffraction-limited width of a laser output allows reduction of a scribe line width, and thereby increases the device density on the semiconductor wafer that is allowable for laser singulation. Since the irradiance profile 207 of the flattened laser output 133 has a diffraction-limited width 303 in its minor axis, it thus provides a sufficiently narrow scribe line width that increases the device density on the semiconductor wafer 102 whilst reducing wastage of the irradiance energy as is the case of the conventional laser output.

Typically, irradiance wastage is proportional to an aspect ratio of a laser output—i.e. the ratio of the laser output width along its major axis or feeding direction to the laser output width along its orthogonal minor axis. An aspect ratio of the flattened laser output 133 can be varied by adjusting the distance and/or the focal length of the cylindrical lenses 125, 127 of the second beam expander 123. The present inventors have found an optimum range—in terms of speed and energy optimisation—of the aspect ratio of the flattened laser output 133 to be between 1.5:1 and 5:1 for laser singulation that involves laser scribing or laser cutting.

Figure 4:
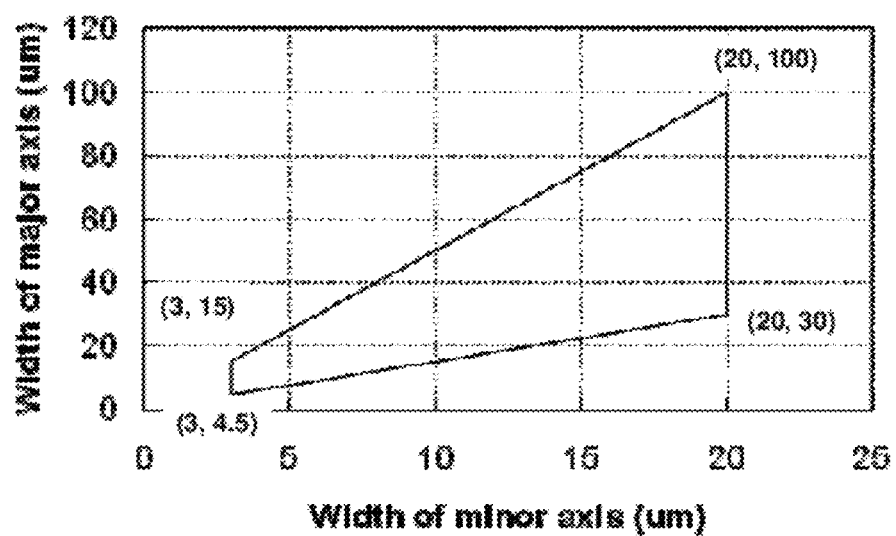
FIG. 4 shows a boundary of optimum aspect ratios of the laser output from the laser system of FIG. 1.

FIG. 4 shows a boundary of the optimum aspect ratios of the flattened laser output 133 with a width along its major feeding axis of between 4.5 and 100 μm and a width along its orthogonal minor axis of between 3 and 20 μm.

It should of course be appreciated that the major axis width may be set to a value of between 20 and 80 μm, or to a value of between 40 and 60 μm. Depending on the targeted (kerf) width of the scribe line, the minor axis width may also be set to a value of between 5 and 15 μm, or between 8 and 12 μm. Accordingly, the optimum aspect ratio range of the flattened laser output 133 may be between 3:1 and 5:1, or between 4:1 and 5:1.

Figure 5:
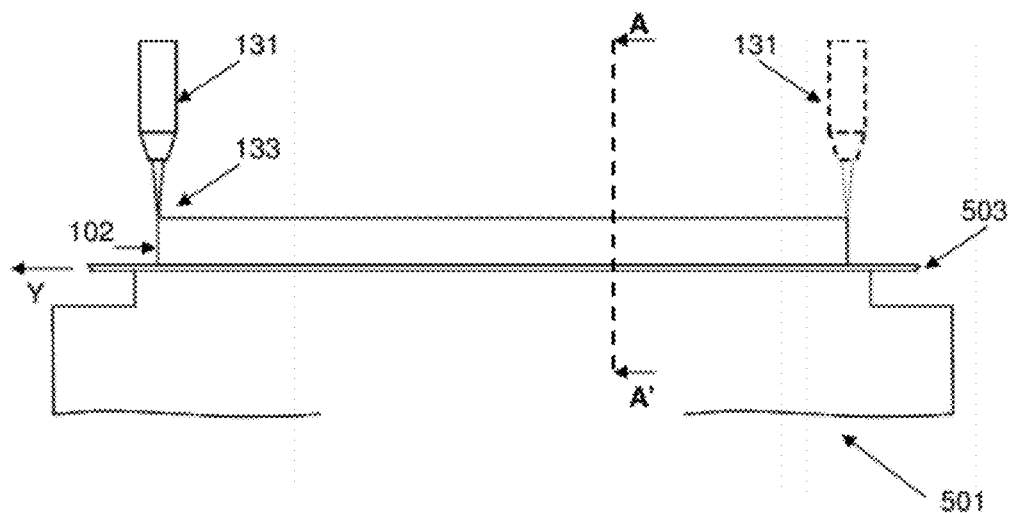
FIG. 5 shows the laser system of FIG. 1 in operation during laser scribing of a semiconductor wafer.

FIG. 5 shows an operation of the laser system 101 during laser scribing.

The semiconductor wafer 102 is carried on a chuck table 501. As the chuck table 501 moves along the Y-direction indicated in FIG. 5, the semiconductor wafer 102 is scribed by the flattened laser output 133. An adhesive tape 503 is further arranged between the semiconductor wafer 102 and the chuck table 501 to secure the semiconductor wafer 102 during scribing. The focusing assembly 131 illustrated by solid lines in FIG. 5 shows its position relative to the semiconductor wafer 102 before the chuck table 501 moves, whereas the focusing assembly 131 illustrated by dotted lines shows its position relative to the semiconductor wafer 102 after the chuck table 501 has moved in the Y-direction for a certain time period. Thus, although the focusing assembly 131 is stationary, its position relative to the semiconductor wafer 102 actually shifts in a direction opposite to the Y-direction moved by the chuck table 501.

The laser system 101 deposits distinct laser pulses both in time and in space on the surface of the semiconductor wafer 102—this means that no two separate laser pulses are deposited on the same location on the semiconductor wafer surface, but are instead deposited with a constant separation (i.e. the pulse distance).

The laser pulse repetition rate of the laser 103 is selected to optimise use of its pulse energy and its irradiance on the semiconductor wafer 102. Depending on the pulse repetition frequency of the laser 103 and the feeding speed constraints, the chuck table 501 moves at an appropriate feeding speed to ensure precise and effective laser irradiation on the semiconductor wafer 102 to form the scribe line.

Thus, the semiconductor wafer 102 receives a substantially constant amount of energy along the feeding direction of the flattened laser output 133 to form a scribe line on the semiconductor wafer 102. Each pulse of the flattened laser output 133 typically has operational pulse energies of between 1 and 30 μJ. Alternatively, the operational pulse energies may be between 5 and 100 μJ, between 20 and 80 μJ, or between 40 and 60 μJ.

Figure 6:
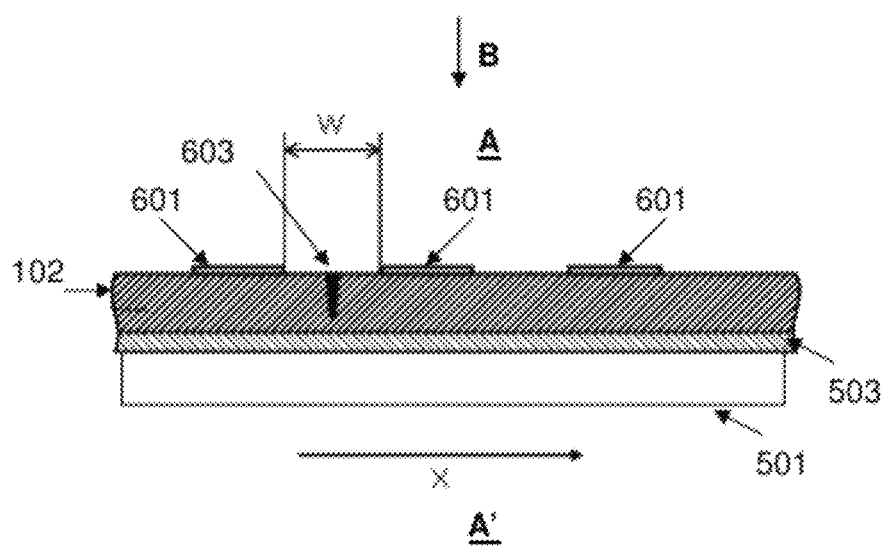
FIG. 6 shows a cross-sectional view of the semiconductor wafer when viewed along line A-A' as shown in FIG. 5.

FIG. 6 shows a cross-sectional view of the semiconductor wafer 102 when viewed along line A-A' indicated in FIG. 5.

It is seen that electronic devices 601 are fabricated on the semiconductor wafer 102 and adjacent electronic devices 601 are separated from each other by a distance W. The space between distance W is known as a street, the width of which is sufficient to accommodate a scribe line 603 on the semiconductor wafer 102 by laser scribing so that the electronic devices 601 can be separated by breakage along the scribe line 603.

Figure 7:
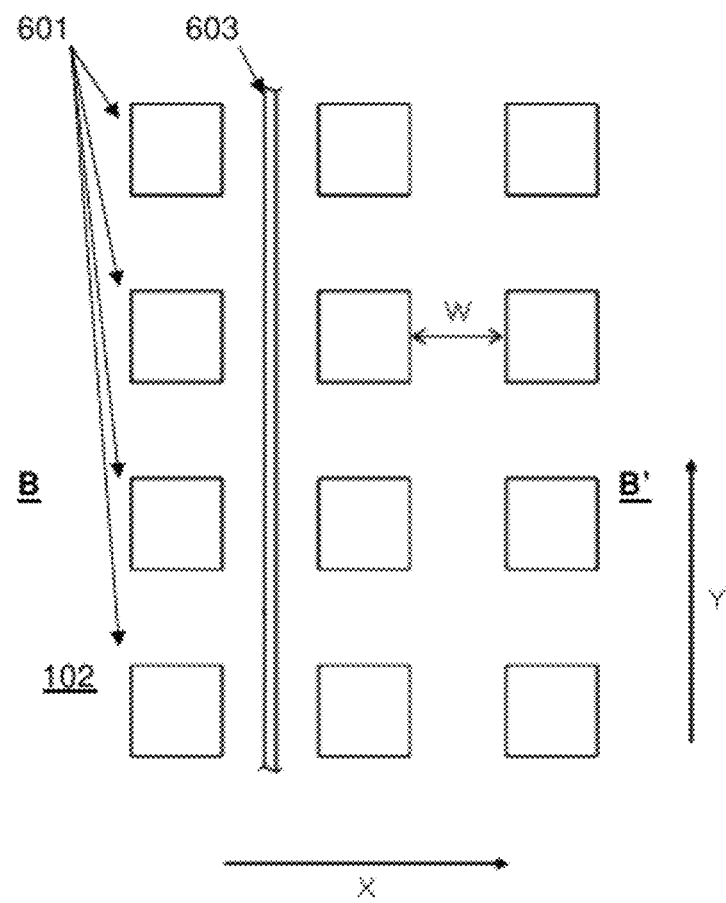
FIG. 7 shows a plan view of the semiconductor wafer in FIG. 6 from direction B as shown in FIG. 6.

FIG. 7 shows a plan view of the semiconductor wafer 102 when viewed from the direction B indicated in FIG. 6. As the flattened laser output 133 has a diffraction-limited width along its minor axis, the width of the scribe line 603 may therefore be made the narrowest possible to increase the device density that is allowable on the semiconductor wafer 102 for laser scribing.

Figure 8A:
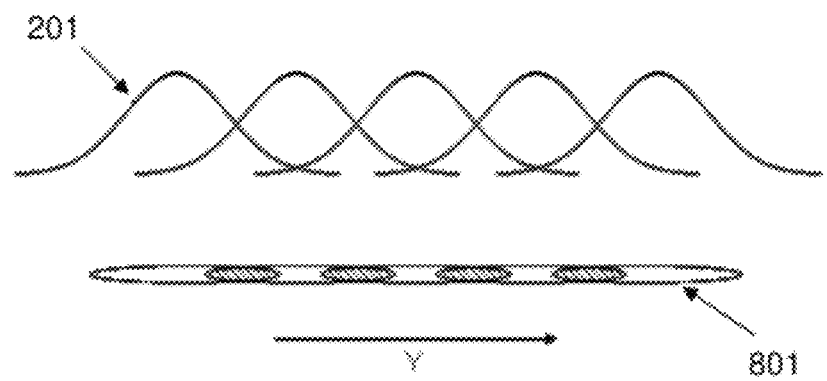
FIGS. 8a and 8b show the cumulative irradiance profiles of the conventional laser spot and the laser output of FIGS. 2a and 2b respectively during laser scribing.
Figure 8B:
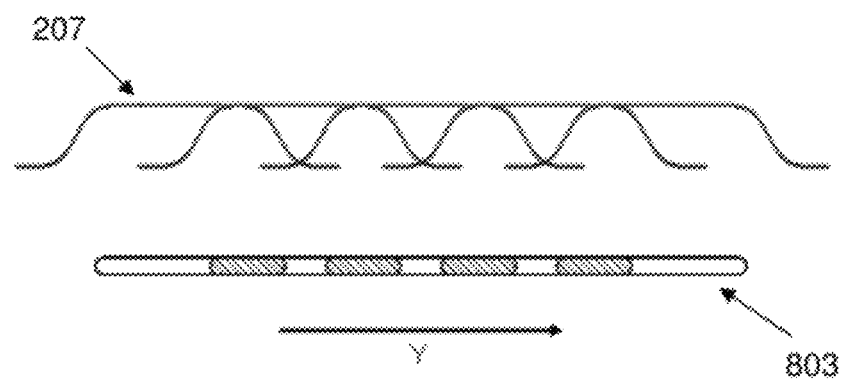

FIGS. 8a and 8b compare the cumulative irradiance profiles 801, 803 delivered on the semiconductor wafer 102 by the conventional laser output and by the flattened laser output 133 during laser scribing. From these figures, it is seen that portions of adjacent irradiance profiles overlap each other as the semiconductor wafer 102 moves in the Y-direction to form a scribe line. It should be appreciated that the corresponding pulse overlapping ratio decreases accordingly with increasing feeding speed of the respective laser output.

FIGS. 9a-9e and 10a-10e compare qualities of the scribe lines as formed on the semiconductor wafer 102 by the conventional laser output and by the flattened laser output 133 respectively.

FIGS. 9a to 9c show the various states of the semiconductor wafer surface during laser scribing using the conventional laser output. Specifically FIG. 9a shows the semiconductor wafer 102 just before receiving the irradiance from the conventional laser output; FIG. 9b shows the semiconductor wafer 102 when it has partially received the irradiance from the conventional laser output; and FIG. 9c shows the semiconductor wafer 102 when it has completely received the irradiance from the conventional laser output. In particular portions 901 of the semiconductor wafer 102 are not removed by the conventional laser output because the irradiance level at the corresponding portions of the conventional laser output is lower than the ablation threshold of the semiconductor wafer 102.

FIGS. 9d and 9e show the resultant scribe line 903 formed by the laser scribing using the conventional laser output as the semiconductor wafer 102 moves in the Y-direction. It can be seen that the resultant scribe line 903 has a varying scribe depth. This is due to the irradiance profile of the conventional laser output along its major axis (or feeding direction) having a Gaussian nature, and thus, the variance of the irradiance level of the conventional laser output is high. Accordingly parts of the resultant scribe line 903 irradiated by a lower irradiance level of the conventional laser output have smaller scribe depths, whereas other parts of the scribe line irradiated by a higher irradiance level of the conventional laser output have larger scribe depths.

Figure 10A:
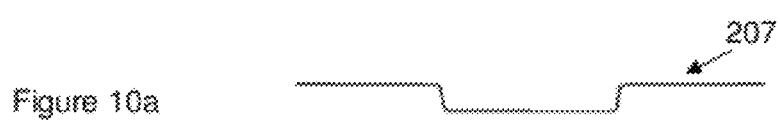
FIGS. 10a to 10e show various cross-sectional views of a semiconductor wafer during laser scribing using the laser output from the laser system of FIG. 1.
Figure 10B:
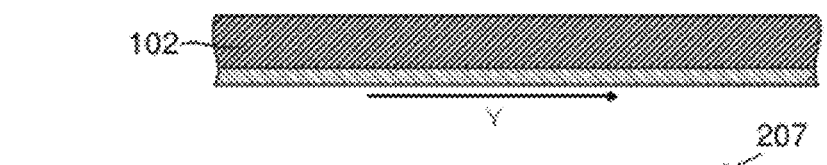
Figure 10C:
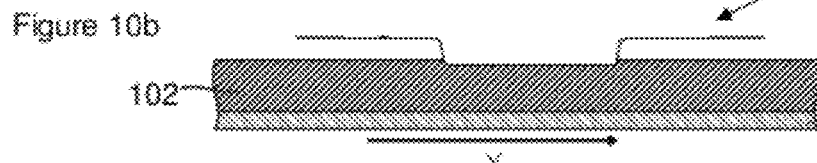

FIGS. 10a to 10c show the various states of a semiconductor wafer surface during laser scribing using the flattened laser output 133. Specifically FIG. 10a shows the semiconductor wafer 102 just before receiving the irradiance from the flattened laser output 133; FIG. 10b shows the semiconductor wafer 102 when it has partially received the irradiance from the flattened laser output 133; and FIG. 10c shows the semiconductor wafer 102 when it has completely received the irradiance from the flattened laser output 133. In particular portions 1001 of the semiconductor wafer 102 are not removed by the flattened laser output 133 because the irradiance level at the corresponding portions of the flattened laser output 133 is lower than the ablation threshold of the semiconductor wafer 102.

Figure 10D:
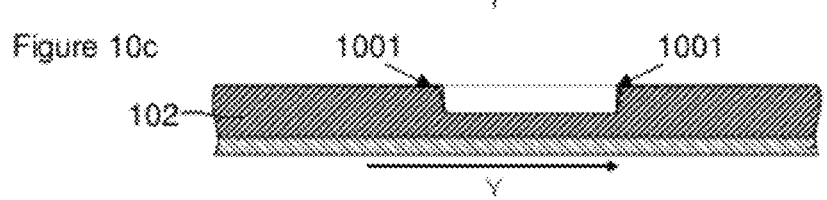
Figure 10E:
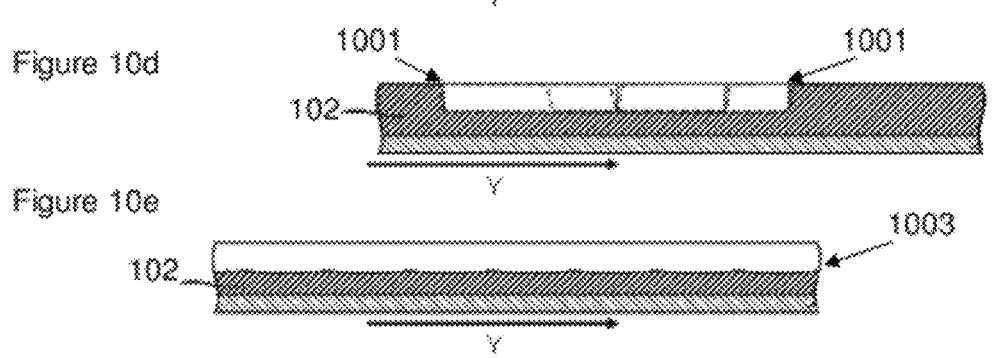

FIGS. 10d and 10e show the resultant scribe line 1003 formed by the laser scribing using the flattened laser output 133 as the semiconductor wafer 102 moves in the Y-direction. In contrast with FIGS. 9d and 9e, the resultant scribe line 1003 formed by the flattened laser output 133 has a more uniform scribe depth than the resultant scribe line 903 formed by the conventional laser output. This is due to a lower variance of the irradiance level of the flattened laser output 133 along its major axis (or feeding direction), and thus, the resultant scribe line 1003 has a more uniform scribe depth, compared with the resultant scribe line 903 formed by the conventional laser output.

In order to avoid the varying scribe depth of the resultant scribe line 903 formed by the conventional laser output, the pulse overlapping ratio of the conventional laser output can be increased to reduce fluctuation of the average irradiance received in each unit of the scribing length along the semiconductor wafer 102. This, however, affects the feeding speed of the conventional laser output as more pulses per unit of the scribing length are required. Accordingly, the use of the conventional laser output may impose a further constraint to its feeding speed if a uniform scribe depth is required.

Therefore, it is seen that using the flattened laser output 133 in laser scribing achieves uniformity of the scribe depth whilst optimising its feeding speed during laser scribing.

It is further seen that by flattening the irradiance profile of the expanded collimated beam 113 through irradiance redistribution and beam shaping, more energy may be delivered to a workpiece for material removal compared with the conventional laser output that has a Gaussian irradiance profile. Thus, the laser system 101 advantageously improves overall efficiency and processing speed for laser singulation by, for example, increasing the feeding speed of the flattened laser output 133.

It should of course be appreciated that many variations of the described embodiment are possible without departing from the scope and spirit of this invention.

Figure 11A:
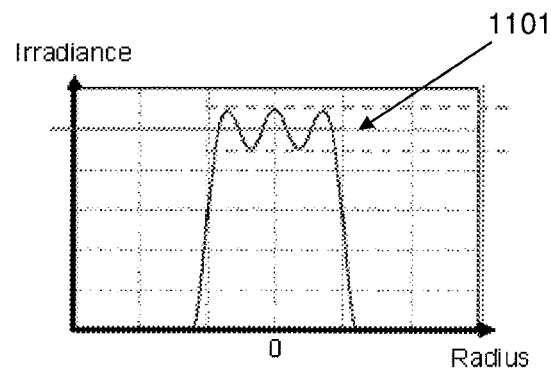
FIGS. 11a to 11c show different variations of the irradiance profile of the laser output from the laser system of FIG. 1.
Figure 11B:
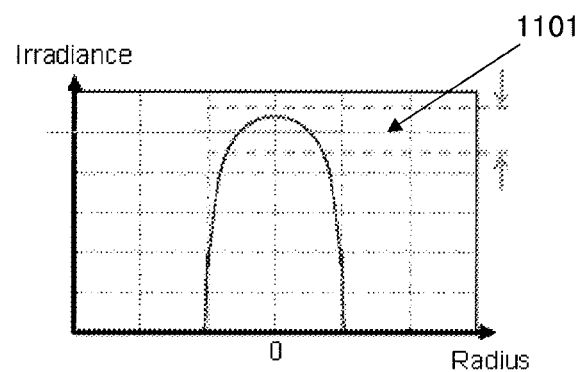
Figure 11C:
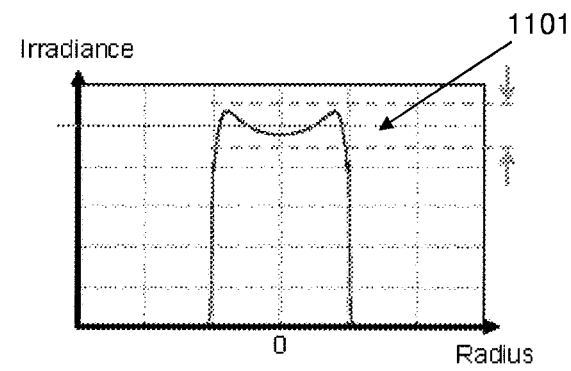

For example, while FIG. 2b shows the flattened laser output 133 having a constant peak irradiance 211 within its characteristic beam width, such a characteristic is merely preferred for laser singulation but not essential. FIGS. 11a to 11c show different irradiance profiles of the flattened laser output 133 without a constant peak irradiance within their characteristic beam width but is nonetheless of substantial uniformity. Specifically, FIGS. 11a to 11c shows alternative configurations of the flattened laser output 133 having respective oscillatory, concave, and convex irradiation spectrums at the central portion of the laser output 133. It is seen that irradiation variation at the respective central portions is limited to ±15% from their respective average (nominal) value 1101. The non-constant irradiance of these different irradiance profiles of the flattened laser output 133 has minimal effect on the feeding speed and efficiency of laser singulation. In fact, it may actually improve the ease of producing the flattened laser output 133 for laser singulation.

It should of course be appreciated that variation of the irradiance level of the flattened laser output 133 may be limited to ±12%, or ±10%, or ±5% from its average (nominal) value at its central portion within its characteristic beam width. Any desired variation of the irradiance of the flattened laser output 133 from its average (nominal) value may be achieved by altering the surface profiles of the pair of aspherical lenses 117, 119.

Furthermore, although it has been described that the irradiance of the flattened laser output 133 has been redistributed along its major longitudinal axis that is aligned to the direction of singulation of the semiconductor wafer 102, it should be appreciated that the irradiance of the flattened laser output 133 is also redistributed along its orthogonal minor axis on the plane of the semiconductor wafer 102.

Figure 12:
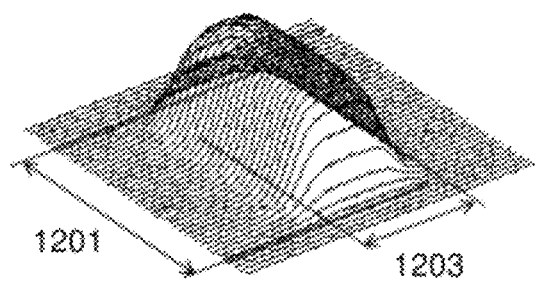
FIG. 12 shows an alternative 3D irradiance profile of the laser output from the laser system of FIG. 1.

Moreover, although the flattened laser output 133 has a diffraction-limited width along its minor axis to provide a sufficiently narrow scribe width, a nominally flat but wider scribe width along its minor axis may be provided by the laser system 101 if desired. FIG. 12 shows an alternative 3D irradiance profile of the flattened laser output 133 that has generally flat irradiance profiles in both its major and minor axes 1201, 1203 to give a more cuboidal appearance. In contrast with the 3D irradiance profile shown in FIG. 3b, the diffraction-limited width of this alternative 3D irradiance profile is larger.

In addition, it should be appreciated that the first and second beam expanders 107, 123 are optional features of the laser system 101. Without either or both of these beam expanders 107, 123, the beam shaper 115 would still be operable to redistribute the irradiance of the laser beam 105 to flatten its irradiance profile. The circular laser spot can then be focused on the semiconductor wafer 102, where its effective irradiation spectrum is used for singulating the semiconductor wafer 102. Also, the laser system 101 may be used to singulate other objects besides semiconductor wafers.

Optionally, the beam expander 107 may also be incorporated in the beam shaper 115 so that the laser 101 directly emits the collimated beam 105 to the beam shaper 115 for both magnification and shaping. In addition, while laser scribing using the laser system 101 has been described, other laser singulation processes such as laser cutting can also be undertaken using the laser system 101.

The invention claimed is:

1. An apparatus for singulating an object, the apparatus comprising:
   a laser configured to emit a laser beam with a Gaussian irradiance profile; and
   a beam-shaping device configured to reshape the Gaussian irradiance profile of the laser beam emitted from the laser, the beam-shaping device having at least first and second aspherical lenses configured to redistribute irradiance of the laser beam, wherein the first aspherical lens is arranged to cause the laser beam to converge and the second aspherical lens is arranged to subsequently cause the converged laser beam to diverge so as to enhance uniformity of the irradiance profile of the laser beam for singulating the object.

2. The apparatus of claim 1, wherein the reshaped irradiance profile of the laser beam includes a peak irradiance that varies within 15% of its average peak irradiance.

3. The apparatus of claim 1, wherein the reshaped irradiance profile of the laser beam includes a peak irradiance that varies within 5% of its average peak irradiance.

4. The apparatus of claim 2, wherein the reshaped irradiance profile of the laser beam includes an oscillatory irradiance profile located at a central portion of the laser beam.

5. The apparatus of claim 2, wherein the reshaped irradiance profile of the laser beam includes a concave irradiation spectrum located at a central portion of the laser beam.

6. The apparatus of claim 1, further comprising a beam-expanding device configured to magnify the laser beam emitted from the laser.

7. The apparatus of claim 6, wherein the beam-expanding device comprises a plurality of aberration-corrected spherical lenses.

8. The apparatus of claim 1, further comprising a beam-expanding device configured to modify the laser beam with the reshaped irradiance profile to define a major longitudinal axis and a minor axis orthogonal to the major longitudinal axis, the modified laser beam having a larger width along the major longitudinal axis than along the minor axis.

9. The apparatus of claim 8, wherein the beam-expanding device comprises a plurality of cylindrical lenses.

10. The apparatus of claim 8, wherein a ratio of the width of the modified laser beam along the major longitudinal axis to the width of the modified laser beam on the minor axis is between 1.5:1 and 5:1.

11. The apparatus of claim 8, wherein a ratio of the width of the modified laser beam along the major longitudinal axis to the width of the modified laser beam on the minor axis is between 3:1 and 5:1.

12. The apparatus of claim 8, wherein the modified laser beam has a substantially trapezoidal three-dimensional irradiation profile.

13. The apparatus of claim 8, further comprising a beam-focusing device configured to focus the modified laser beam on the object, such that the width of the modified laser beam along the major longitudinal axis is aligned with a direction of singulation of the object.

14. The apparatus of claim 13, wherein the apparatus is configured to singulate a semiconductor wafer.

15. A device for use as the beam-shaping device of the apparatus of claim 1.

16. A method of singulating an object, the method comprising the steps of:
    emitting a laser beam with a Gaussian irradiance profile;
    redistributing irradiance of the emitted laser beam using at least first and second aspherical lenses to reshape the Gaussian irradiance profile, wherein the first aspherical lens is arranged to cause the laser beam to converge and the second aspherical lens is arranged to subsequently cause the converged laser beam to diverge so as to enhance uniformity of the irradiance profile of the laser beam for singulating the object.

17. The method of claim 16, further comprising the step of magnifying the emitted laser beam before the step of redistributing the irradiance of the laser beam.

18. The method of claim 16, further comprising the step of modifying the laser beam after the step of redistributing the irradiance of the laser beam, so that the modified laser beam defines a major longitudinal axis and a minor axis orthogonal to the major longitudinal axis, wherein the modified laser beam has a larger width along the major longitudinal axis than along the minor axis.

19. The method of claim 18, further comprising the step of focusing the modified laser beam on the object after the step of redistributing the irradiance of the laser beam, such that the width of the modified laser beam along the major longitudinal axis is aligned with a direction of singulation of the object.

* * * * *